United States Patent
McLaren et al.

(10) Patent No.: US 11,060,613 B2
(45) Date of Patent: Jul. 13, 2021

(54) RADIAL SEGMENTED SEAL WITH AIR CURTAIN GENERATOR

(71) Applicant: Eaton Intelligent Power Limited, Dublin (IE)

(72) Inventors: Brandon B. McLaren, Rehoboth, MA (US); Drew Bangs, Foster, RI (US)

(73) Assignee: Eaton Intelligent Power Limited, Dublin (IE)

( * ) Notice: Subject to any disclaimer, the term of this patent is extended or adjusted under 35 U.S.C. 154(b) by 134 days.

(21) Appl. No.: 16/193,528

(22) Filed: Nov. 16, 2018

(65) Prior Publication Data

US 2019/0162309 A1 May 30, 2019

Related U.S. Application Data

(60) Provisional application No. 62/590,701, filed on Nov. 27, 2017.

(51) Int. Cl.
 *F16J 15/34* (2006.01)
 *F16J 15/16* (2006.01)
 *F16J 15/44* (2006.01)

(52) U.S. Cl.
 CPC ............. *F16J 15/164* (2013.01); *F16J 15/34* (2013.01); *F16J 15/442* (2013.01); *F16J 15/443* (2013.01)

(58) Field of Classification Search
 CPC .......... F16J 15/164; F16J 15/34; F16J 15/442; F16J 15/443
 See application file for complete search history.

(56) References Cited

U.S. PATENT DOCUMENTS

| | | | |
|---|---|---|---|
| 3,575,424 A | 4/1971 | Taschenberg | |
| 4,145,058 A * | 3/1979 | Hady | F16J 15/441 277/366 |
| 5,558,341 A * | 9/1996 | McNickle | F16J 15/3488 277/400 |
| 6,338,490 B1 * | 1/2002 | Bainachi | F16J 15/442 277/400 |
| 2008/0157479 A1 * | 7/2008 | Vasagar | F16J 15/441 277/400 |
| 2012/0223490 A1 * | 9/2012 | Ruggeri | F16J 15/442 277/632 |
| 2014/0072415 A1 | 3/2014 | Zheng et al. | |
| 2018/0252317 A1 * | 9/2018 | Prenger | F16J 15/447 |
| 2018/0372229 A1 * | 12/2018 | Bidkar | F16J 15/445 |
| 2019/0072186 A1 * | 3/2019 | Bidkar | F16J 15/4476 |
| 2019/0093496 A1 * | 3/2019 | Hardikar | F16J 15/342 |
| 2019/0203842 A1 * | 7/2019 | Bidkar | F16J 15/4476 |

OTHER PUBLICATIONS

French Search Report, FR 1871805, dated Mar. 25, 2020.

* cited by examiner

*Primary Examiner* — Gilbert Y Lee
(74) *Attorney, Agent, or Firm* — Fishman Stewart PLLC

(57) ABSTRACT

A radial seal segment includes a radial air dam. The radial air dam includes at least one air curtain generator provided along an inside diameter of the radial air dam. The radial seal segment may include one or more hydrodynamic features. The radial seal segment may include a plurality of radial air dam grooves. A sealing assembly may include such radial seal segments.

18 Claims, 15 Drawing Sheets

RADIAL SEGMENTED SEAL WITH AIR CURTAIN GENERATOR

CROSS-REFERENCE TO RELATED APPLICATION

This application claims the benefit of U.S. Provisional Patent Application Ser. No. 62/590,701, filed on Nov. 27, 2018, the disclosure of which is hereby incorporated herein by reference in its entirety.

TECHNICAL FIELD

The present disclosure generally relates to radial segmented seals, including radial segmented seals and systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Segmented radial or circumferential seals have been employed in a number of environments associated with compressible and incompressible fluids. They have been used, for example, in connection with gas turbine engines. Such radial seals may serve to, among other things, seal high pressure areas from low pressure areas. For some applications, steps, pads, and/or hydrodynamic features may be included to generate hydrodynamic forces.

When operating in air/fluid environments that may have low differential pressure, segmented seals can experience fluid ingress along the radial sealing interface of the sealing elements. In some instances, such a low differential pressure can result in undesirable conditions, such as increased susceptibility to leakage and/or a reduced or diminished aerodynamic performance.

There is a desire for solutions/options that minimize or eliminate one or more challenges or shortcomings of seals. The foregoing discussion is intended only to illustrate examples of the present field and should not be taken as a disavowal of scope.

SUMMARY

An embodiment of a radial seal segment may include one or more hydrodynamic features, and a radial air dam. Although, some embodiments of a radial seal segment may include a radial air dam without hydrodynamic features, e.g., may be more of the type of a "contacting seal." In embodiments, the radial air dam may include at least one air curtain generator provided along an inside diameter of the radial air dam.

A sealing assembly including such a radial seal segment is also disclosed.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
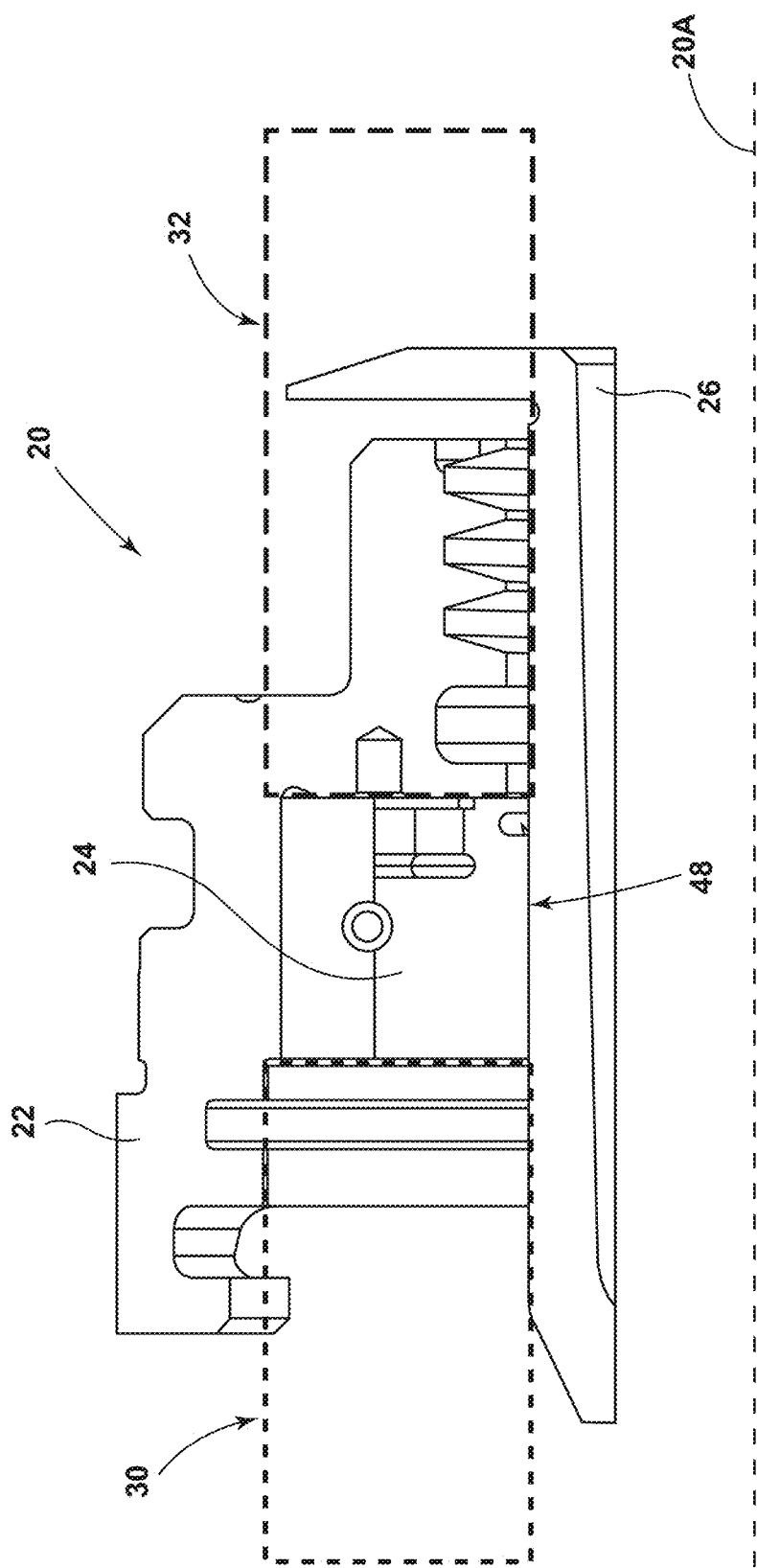
FIG. 1 is a cross-sectional side elevation view generally illustrating an embodiment of a sealing assembly according to teachings of the present disclosure.
Figure 2:
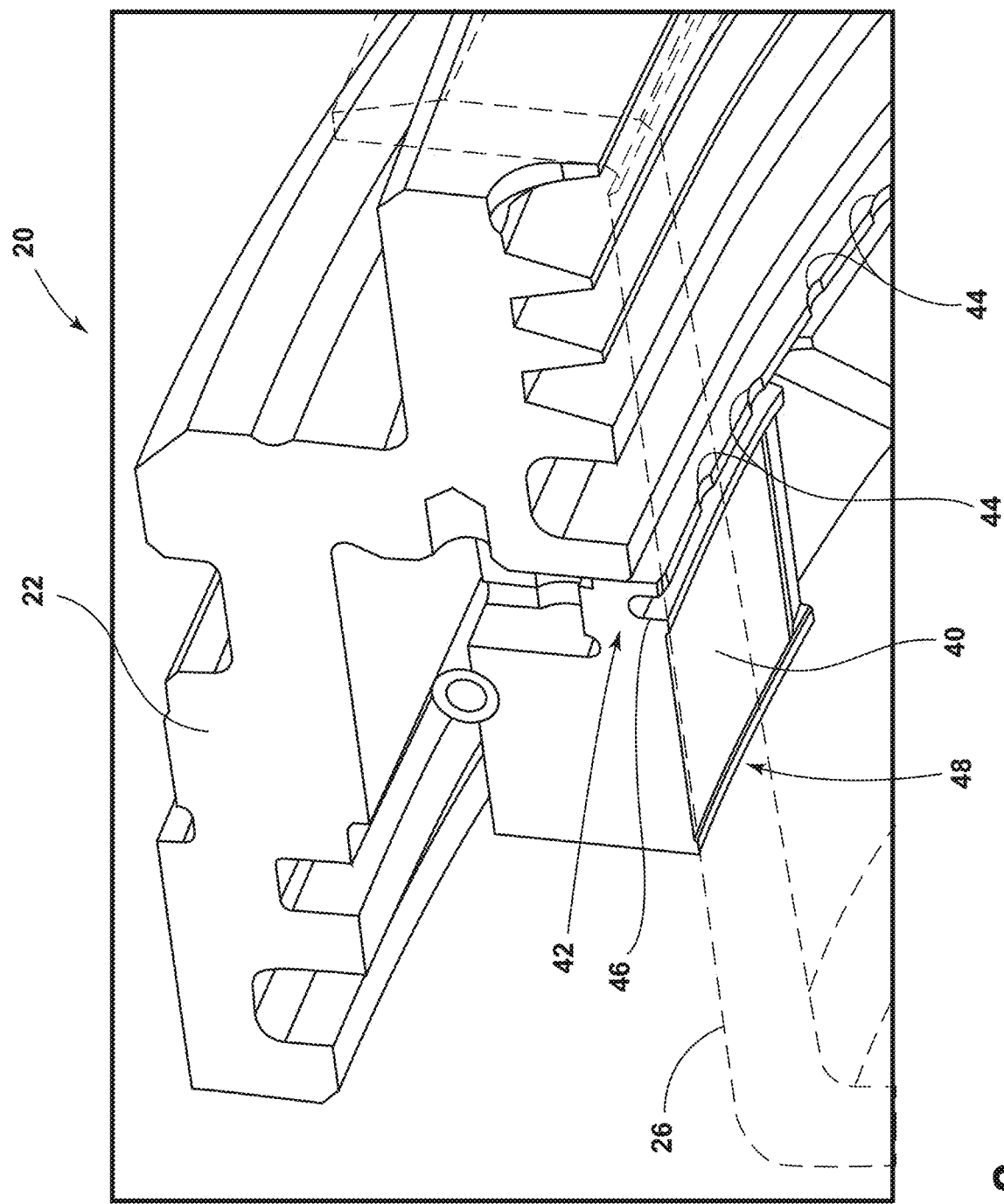
FIG. 2 is an enlarged cross-sectional perspective view of a portion of the sealing assembly illustrated in FIG. 1.

In embodiments, such as generally illustrated in FIG. 1, a sealing assembly 20 may include a seal housing 22, a radial seal segment 24, and/or a seal runner 26. In embodiments, the sealing assembly 20 may have an air side 30 (shown to the left in FIG. 1) and a fluid side 32 (shown to the right in FIG. 1). As generally illustrated in the portion shown in FIG. 2, the seal assembly 20 may include a hydrodynamic feature 40, a radial air dam 42, and/or an air curtain generator 44. A radial air dam 42 may include an air dam groove 46. A sealing assembly 20 may also include one or more various other components that are commonly included with radial seal assemblies including, for example and without limitation, springs (e.g., garter springs and/or coil springs), anti-rotation features/formations, and others. The seal assembly 20 may include an axis 20A.

In embodiments, one or more air curtain generators 44 may be included with a radial air dam 42 to direct high-pressure fluid (e.g., air) from the hydrodynamic features 40 to the fluid side 32 of the sealing assembly 20. The air curtain generators 44 may be disposed along a circumference of an inner diameter 42A of the radial air dam 42. The high-pressure air and/or velocity may generate an air cushion (or barrier) that can impede or minimize fluid (e.g., liquid) ingress into the radial sealing interface 48 (see, e.g., air curtain 52 generally illustrated in FIGS. 6 and 7). With hydrodynamic applications, such configurations can also generate a favorable pressure differential over the hydrodynamic features 40, which can result in improved performance. However, it is noted that the disclosure is not limited to seal assemblies 20 with hydrodynamic features 40, and some embodiments may include one or more air curtain generators 44 that are included with a radial air dam 42, but do not include hydrodynamic features 40 (e.g., "contacting" radial seal segments).

When included, hydrodynamic features 40 may comprise one or more various features configured to provide a hydrodynamic effect (e.g. slots, recess, ridges, protrusions, etc.).

In embodiments, the air curtain generators 44 may, for example and without limitation, be added along a circumference of an inside/inner diameter 42A of a radial seal dam 42.

In embodiments, the air curtain generators 44 may, for example and without limitation, comprise a series of sequential reliefs that may allow high pressure air generated or directed by the hydrodynamic features 40 into the fluid side 32 of the sealing assembly 20 to generate an air curtain. In other embodiments, rather than (or in addition to) reliefs, the air curtain generator(s) 44 may, for example and without limitation, comprise a series of formations or protrusions that extend outwardly to some degree from the surface, or even a combination of reliefs and protrusions.

The air curtain generators 44 may use the high-pressure air to create an air curtain/barrier 52 (e.g., a high energy air barrier) to impede or prevent fluid ingress into the radial sealing interface 48 during operation. Moreover, fluid that may have permeated the radial sealing interface 48 during application startup, shutdown, or period of "no-use" may be forced out of the air curtain generators 44 by high-pressure air. Performance of the hydrodynamic feature(s) 40 may also be improved by creating a favorable pressure differential across the hydrodynamic features 40 (e.g., via the air curtain generators 44), which may promote improved/greater airflow.

Figure 3:
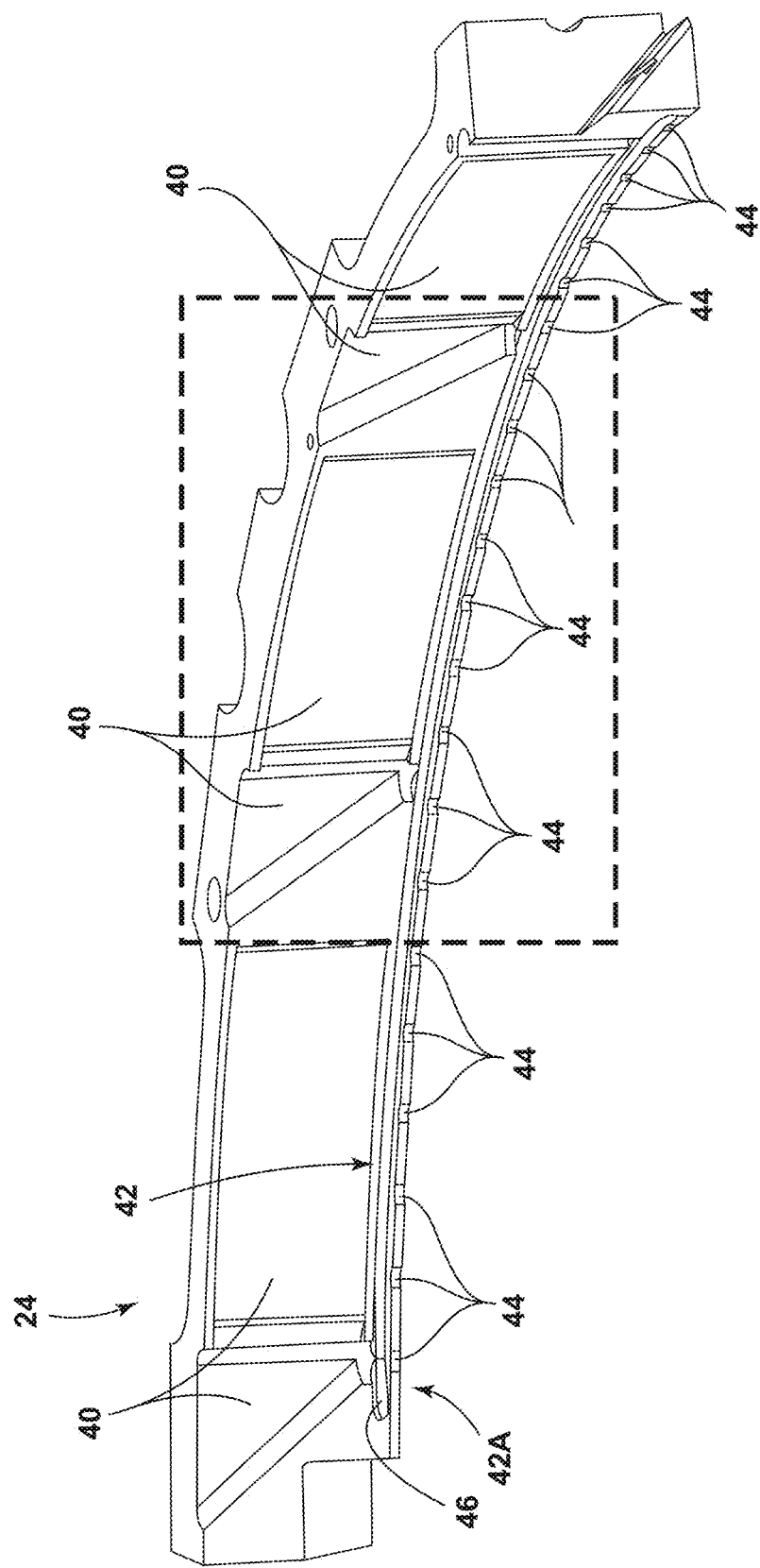
FIG. 3 is a perspective view generally illustrating an embodiment of a radial seal segment according to teachings of the present disclosure.
Figure 4:
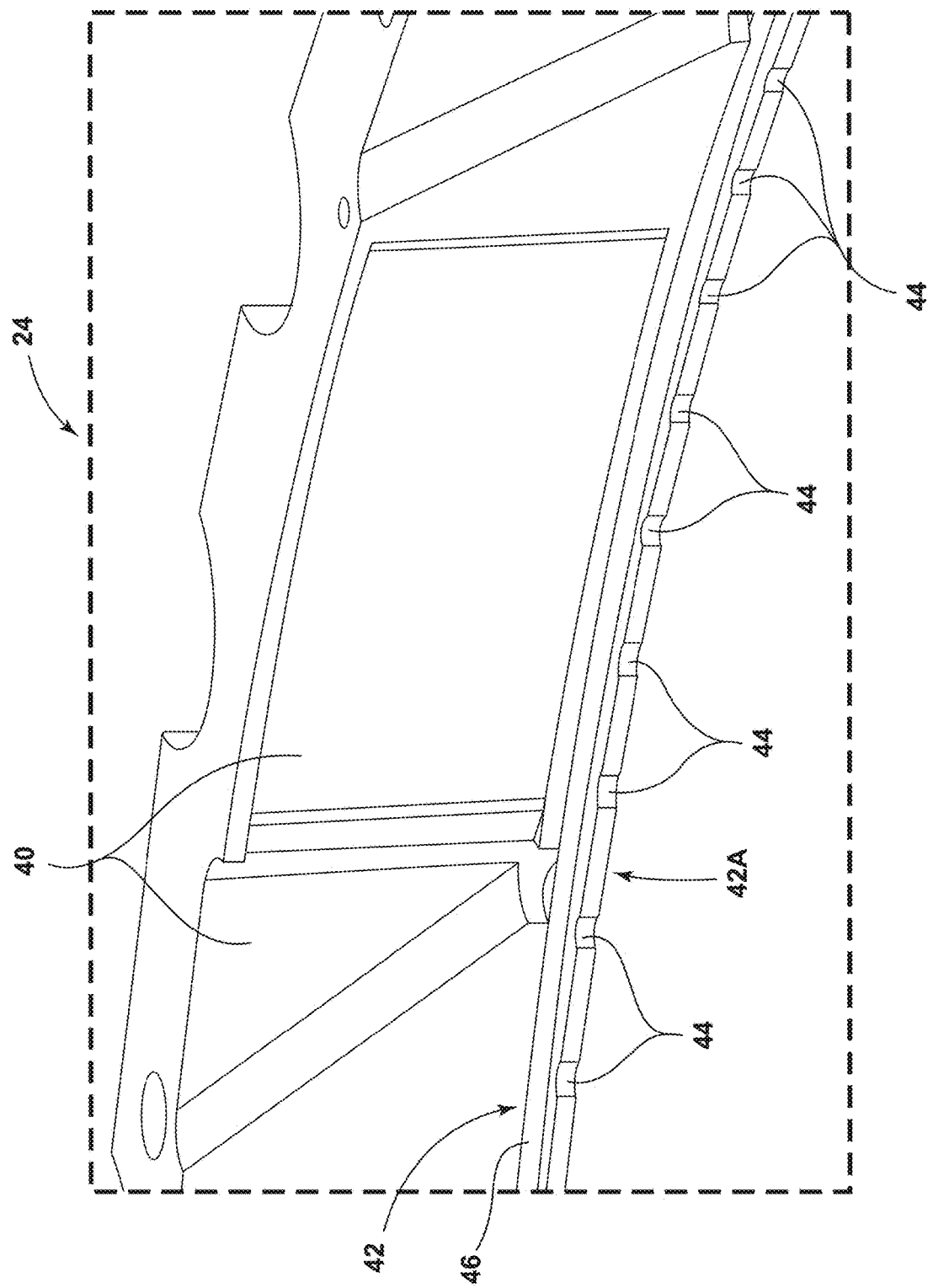
FIG. 4 is an enlarged perspective view of a portion of the radial seal segment illustrated in FIG. 3.

FIGS. 3 and 4 illustrate an embodiment of a radial seal segment 24. As generally shown, a radial seal segment 24 may include hydrodynamic features 40, a radial air dam 42, and a plurality of air curtain generators 44. As generally illustrated in FIG. 4, an air curtain generator 44 may have a curved or semi-circular shape provided into a face of a radial air dam 42. FIG. 4 depicts a plurality of air curtain generators 44 with such a shape that are disposed along the radial air dam 42.

While air curtain generators 44 that have a substantially curved or semi-circular shape are shown, the concept is not limited to such a shape or configuration. For example and without limitation, in embodiments, an air curtain generator 44 may have a curved, circular, semi-circular, triangular, or rectangular shape or configuration (or other configuration). Further, the placement, spacing and/or succession of a plurality of air curtain generators 44 may be variable and/or substantially continuous (over all or portions of an air dam 42). For some embodiments, air curtain generators 44 may be substantially equally spaced in succession (e.g., intervals) along an inner diameter 42A of an air dam 42.

Figure 5:
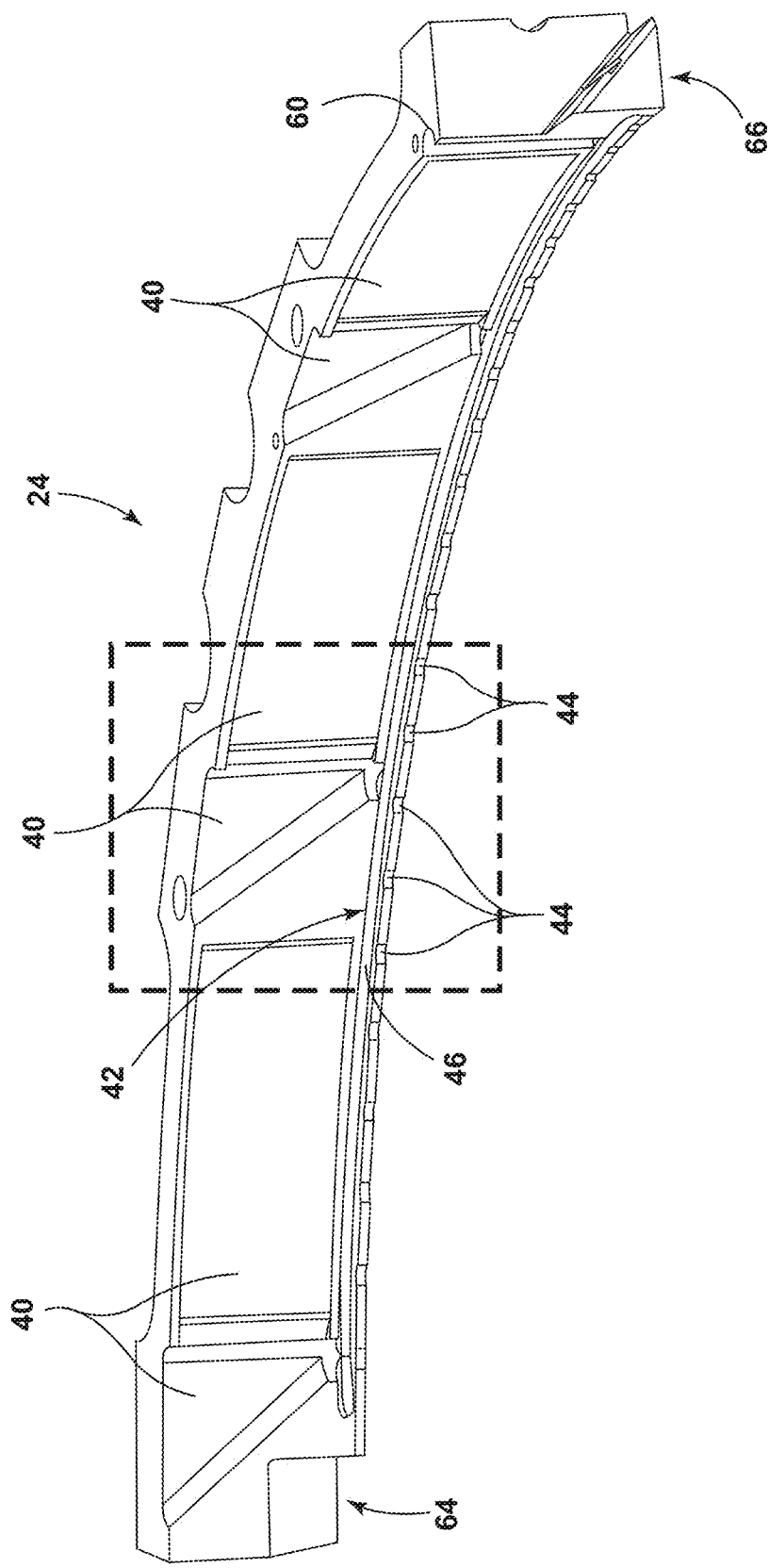
FIG. 5 is a perspective view generally illustrating an embodiment of a radial seal segment according to teachings of the present disclosure.

FIG. 5 depicts an embodiment of a radial seal segment. The radial seal segment is substantially of the type shown in FIG. 3.

Figure 6:
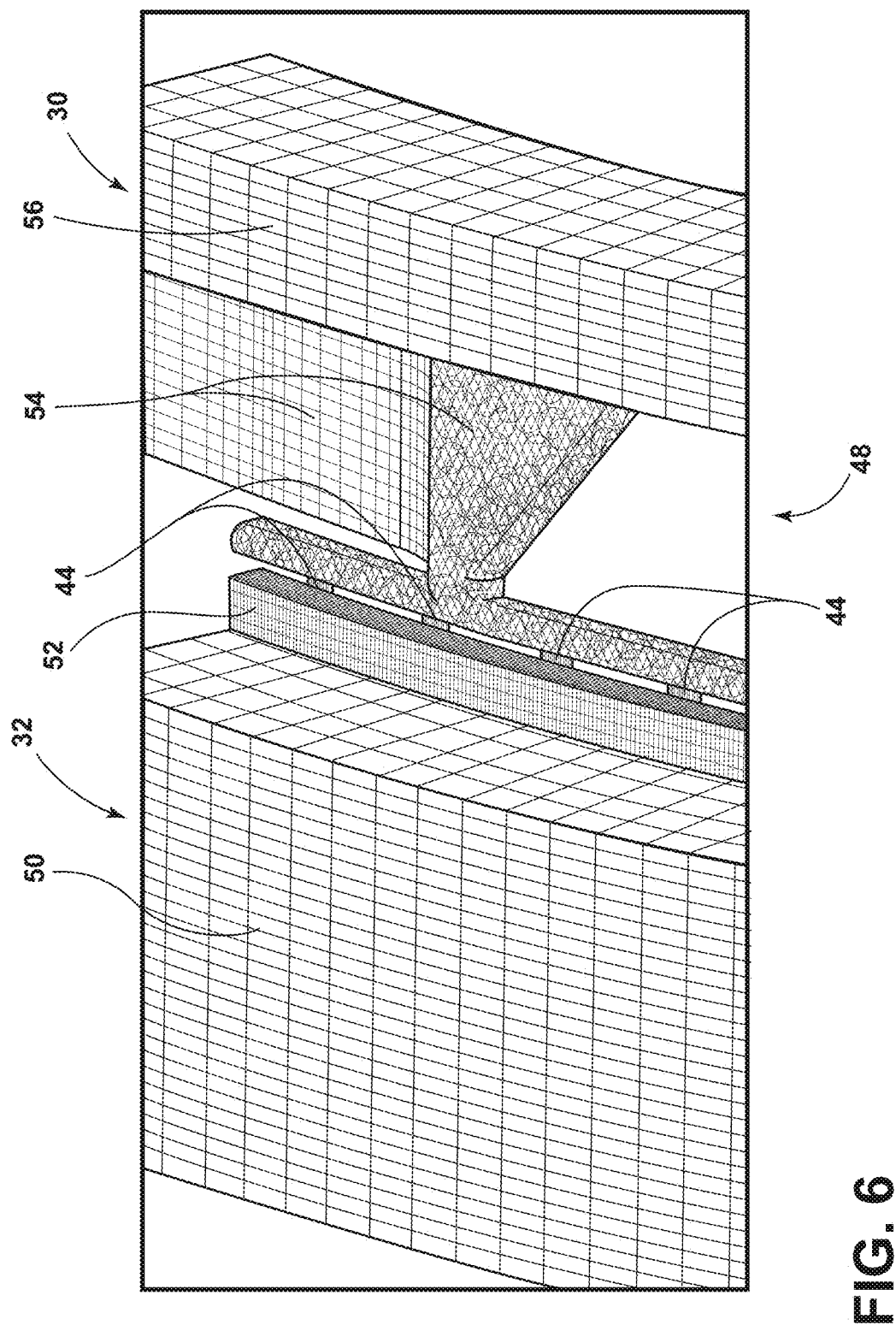
FIG. 6 represents a computational fluid dynamics (CFD) analysis (mesh) of the illustrated portion shown in FIG. 5.

FIG. 6 represents a computational fluid dynamics (CFD) analysis (mesh) of the illustrated portion (Area of Analysis) identified in FIG. 5. In FIG. 6, an air/liquid volume 50 is shown to the far left and a fluid volume/air curtain 52 is depicted between the air/liquid volume 50 and several air curtain generators 44. An air volume 56 is shown to the far right, with hydrodynamic feature volumes 54 shown between the air volume 56 and the air curtain generators 44.

Figure 7:
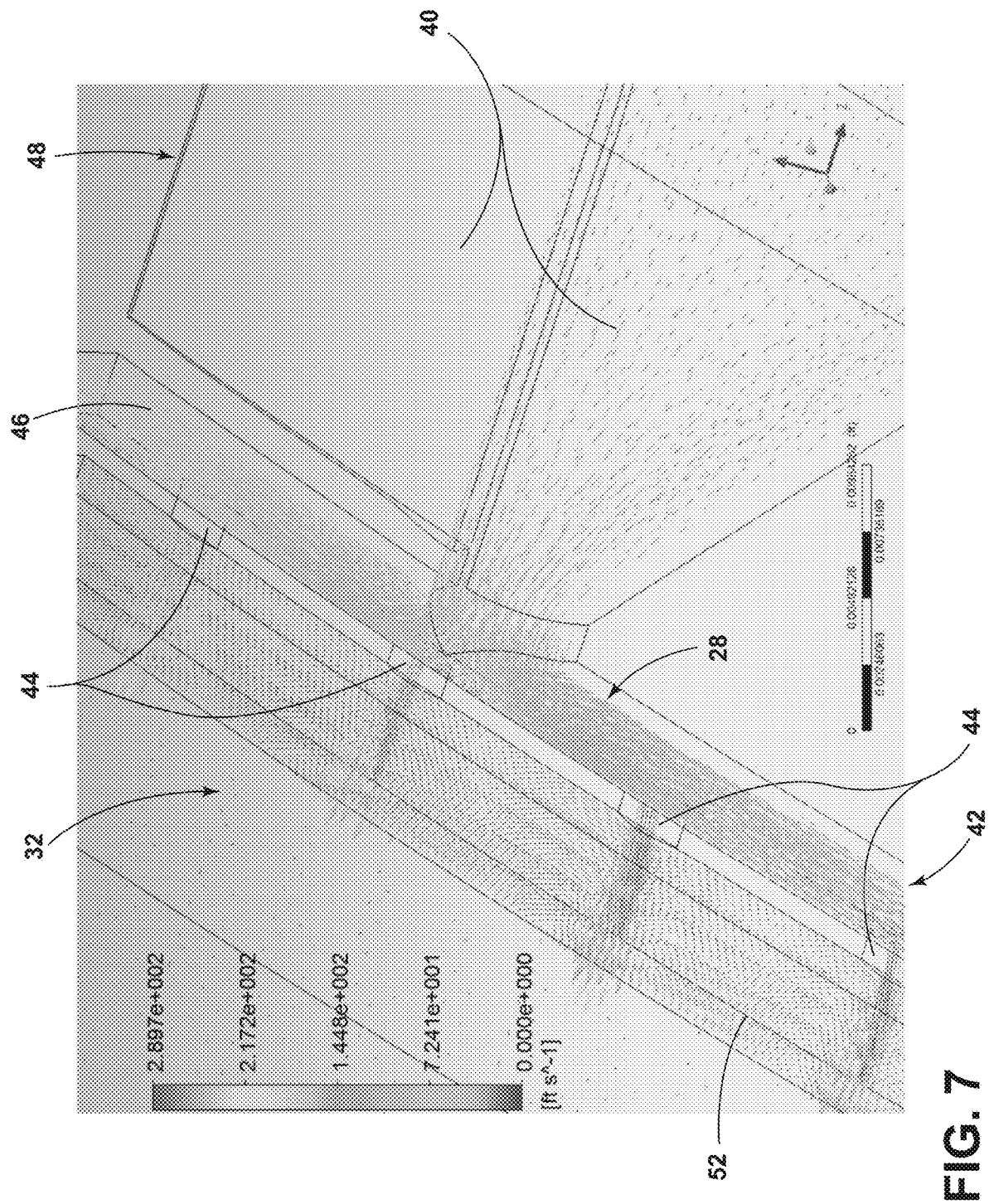
FIG. 7 represents a CFD velocity analysis associated with the portion shown in FIG. 5.

FIG. 7 represents a CFD velocity analysis associated with the Area or Analysis included in FIG. 5. The velocity is shown in terms of freestream velocity (ft s$^{-1}$). The air curtain generators 44 may facilitate formation of an air curtain 52. For example and without limitation, fluid 28 (e.g., air) may flow from the air volume 56 to the hydrodynamic features 40 (if any), fluid from the hydrodynamic feature volumes 54 may flow to the radial air dam 42/radial air dam groove 46, and fluid may flow from the air dam groove 46 through the air curtain generators 44 to generate an air curtain 52, which may limit the flow of fluid (e.g., liquid) from the fluid side 32 to (or beyond) the sealing interface 48.

While some specific embodiments are illustrated and described, it is noted that one or more parameters associated with the radial seal segments 24 and associated air curtain generators 44 may be modified (e.g., even "mixed and matched") to provide various combinations within the scope of the present disclosure. Some of the parameters include the following:

(1) Air dam groove depth (e.g., in a radial direction)
    (a) Constant
    (b) Tapering/variable
(2) Air dam groove length
    (a) Complete segment inner diameter circumference
    (b) Singular pad inner diameter circumference
(3) Air dam groove count
    (a) Singular
    (b) Multiple/double/stacked
(4) Air curtain generator shape/geometry
    (a) Curved/circular/semi-circular
    (b) Triangular
    (c) Rectangular
    (d) Variable
    (e) Continuous
(5) Air dam groove inlet (feed)
    (a) Hydrodynamic pad inlet(s)
    (b) Segment joint For example and without limitation, FIGS. 8 through 13 generally illustrate several embodiments of radial seal segments 24 in accordance with aspects and/or teachings of the present disclosure.

Figure 8:
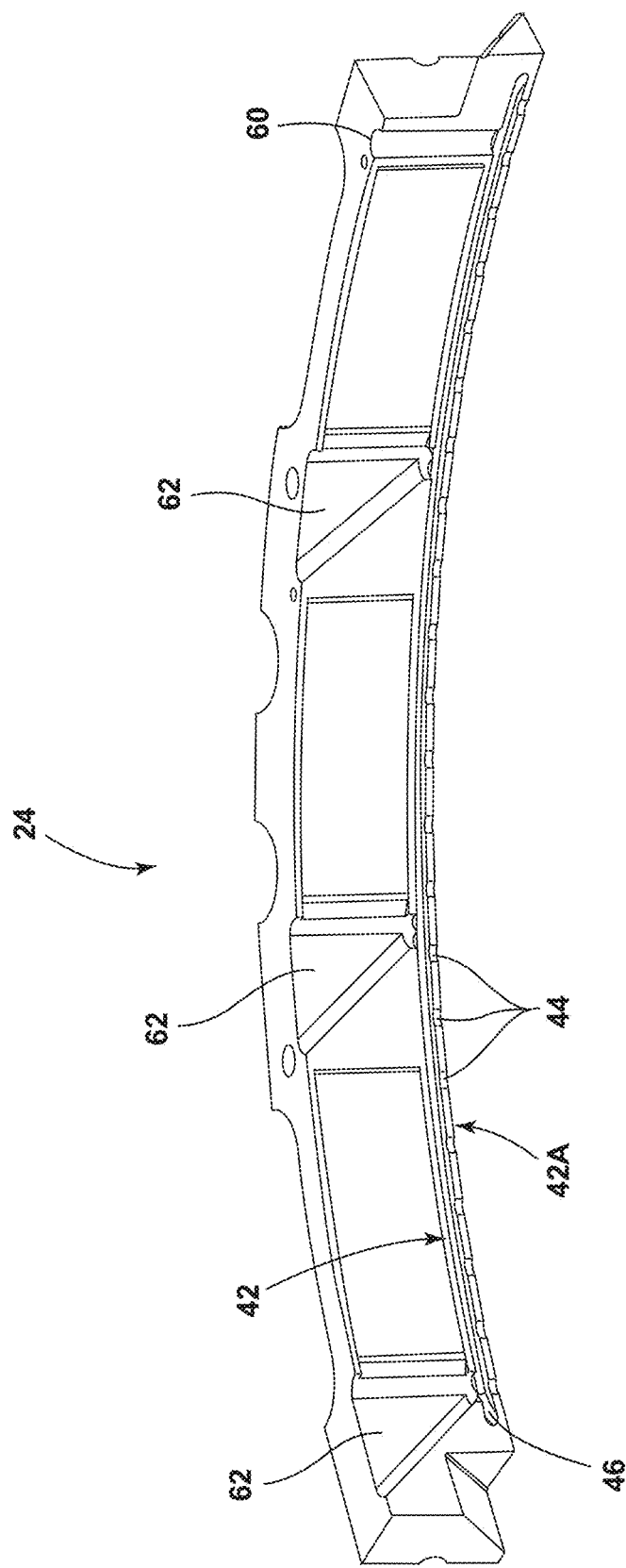
FIGS. 8 through 15 are perspective views generally illustrating several embodiments of radial seal segments in accordance with aspects and/or teachings of the present disclosure.

With reference to the embodiment of a radial seal segment 24 illustrated in FIG. 8, an air dam 42 may be provided and may include an air dam groove 46. The radial seal segment 24 may include an axial groove 60 that may be connected to the air dam groove, such as at or about a rear end of the air dam groove. The air dam groove 46 may be fed by one or more pad inlets 62, such as generally illustrated. The air dam 42 may include a plurality of air curtain generators 44 that may be disposed along the air dam 42. The air curtain generators 44 may be relatively deep (e.g., in a radial direction). For example and without limitation, twenty-two (22) deep air curtain generators 44 may be provided along the air dam 42. In embodiments, the air dam groove 46 may have a substantially constant depth fed by a plurality of pad inlets 62. The air curtain generators 44 may be generally equally spaced (e.g., circumferentially) along the inner diameter 42A of the air dam 42 and may be about 0.005 inches deep (Ø 0.080 in.). The foregoing dimensions are intended to be exemplary only, and are not intended to limit the scope of the claims.

Figure 9:
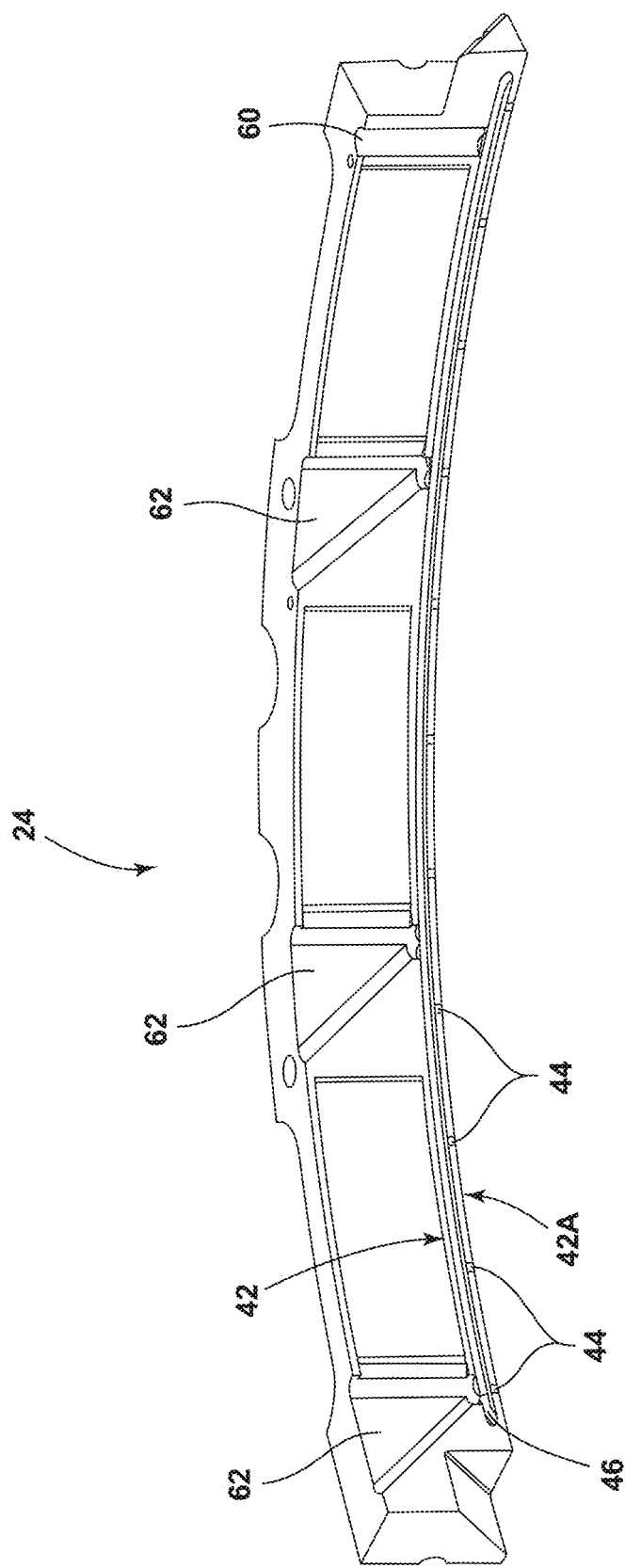

With reference to the embodiment of a radial seal segment 24 illustrated in FIG. 9, an air dam groove 46 may be provided. As with FIG. 8, the embodiment of a radial seal segment 42 shown in FIG. 9 may include an axial groove 60 (connected to the air dam groove 46) and the air dam groove 46 may be fed by one or more pad inlets 62. The air dam 42 may include a plurality of shallow air curtain generators 44 disposed along the air dam 42. For example and without limitation, eleven (11) shallow air curtain generators 44 may be provided along the air dam 42. In embodiments, the air dam groove 46 may have a substantially constant depth fed by a plurality of pad inlets 62. The air curtain generators 44 may be generally equally spaced along the inner diameter 42A of the air dam 44 and may be about 0.001 inches deep (Ø 0.080 in.). The foregoing dimensions are intended to by exemplary only, and are not intended to limit the scope of the claims.

Figure 10:
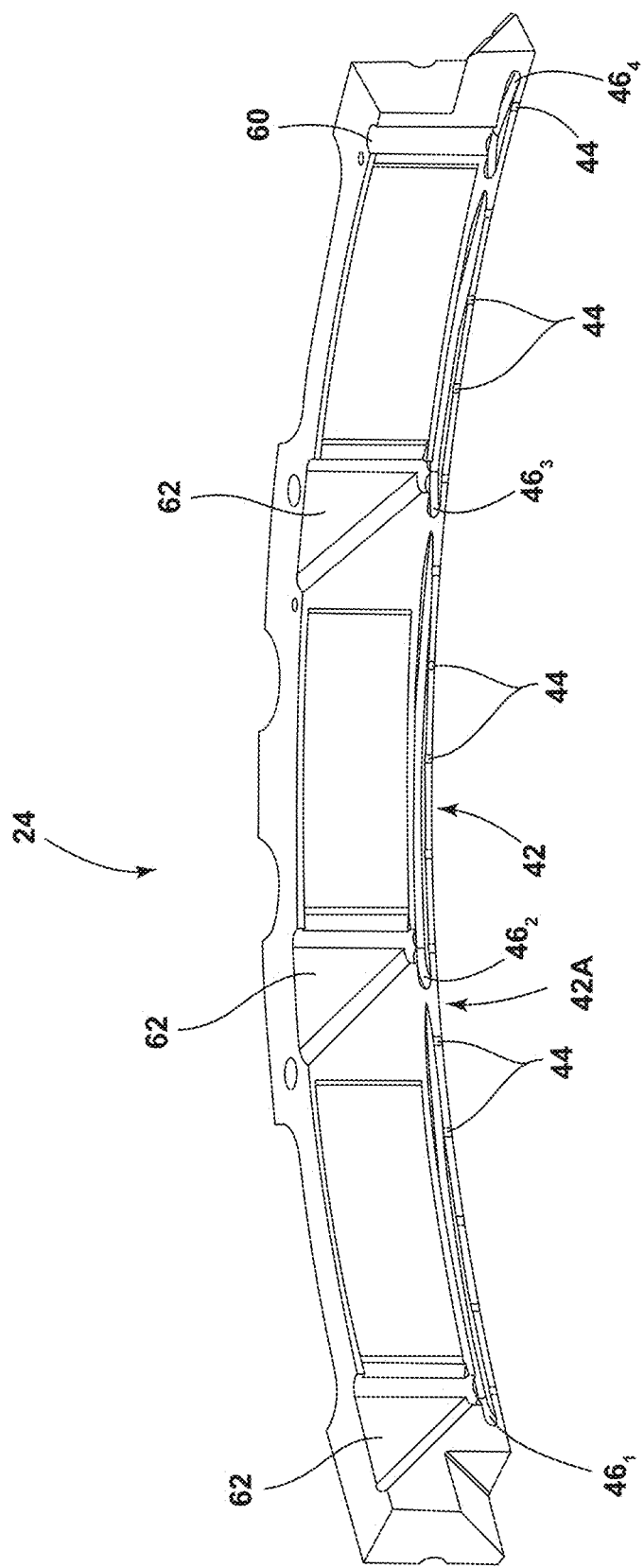

With reference to the embodiment of a radial seal segment 24 illustrated in FIG. 10, individual air dam grooves 46—which may have tapering depth—may be provided. For example and without limitation, a plurality of individual air dam grooves $46_1$, $46_2$, $46_3$, $46_4$ may be circumferentially spaced at or about an inner diameter 42A of the air dam 42. The radial seal segment 24 may include an axial groove 60 that may be connected to an air dam groove (e.g., groove $46_4$), and the air dam groove 46 may be fed by one or more pad inlets 62, such as generally illustrated. As generally illustrated, shallow air curtain generators 44 may be disposed along each air dam groove $46_1$, $46_2$, $46_3$, $46_4$. For example and without limitation, individual air dam grooves $46_1$, $46_2$, $46_3$, $46_4$ may have a tapering depth for each pad inlet 62, there may be a pressure balance axial groove 60, and the radial air dam grooves $46_1$, $46_2$, $46_3$, $46_4$ may be fed by pad inlets 62 with substantially equally spaced generators 44 provided along an inner diameter of the air dam 42.

Figure 11:
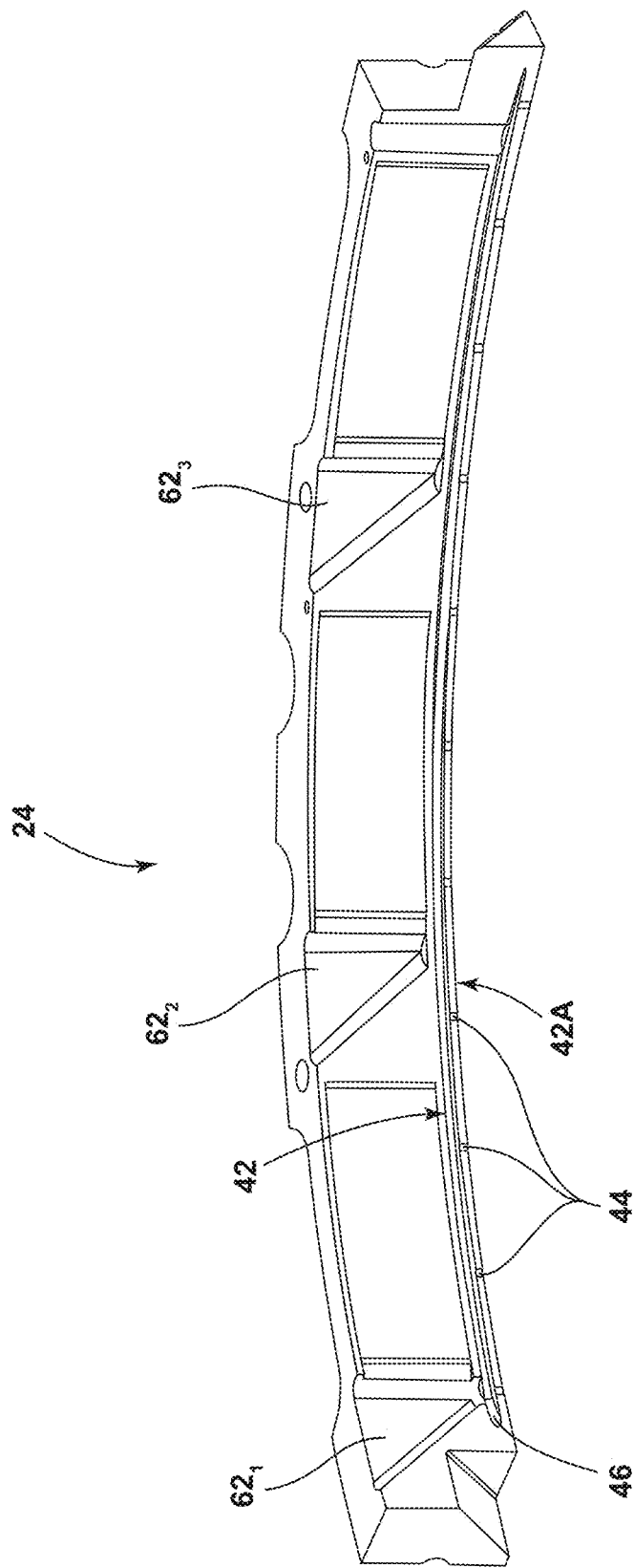

With reference to the embodiment of a radial seal segment 24 illustrated in FIG. 11, a single air dam groove 46 may be provided, and the air dam groove 46 may have a tapering depth. A plurality of air curtain generators 44 (e.g., shallow air curtain generators) may be provided along the air dam 42. An axial groove 60 may be connected to the air dam groove 46, and may serve, at least in part, as a drain. In an embodiment, an air dam groove 46 may be configured to be fed by a first pad inlet $62_1$, and subsequent pad inlets (e.g., a second pad inlet $62_2$ and a third pad inlet $62_3$) may be configured to not feed the air dam groove 46. With such embodiments, an air dam groove 46 of tapering depth may be fed by a first pad inlet $62_1$ with a rear axial groove 60 connected to the air dam groove 46 serving as an exit to channel fluid (e.g., oil) out of the air dam groove 46. A plurality of substantially equally spaced air curtain generators 44 may be provided along an inner diameter 42A of the air dam 42 (e.g., to potentially provide a high differential pressure configuration).

Figure 12:
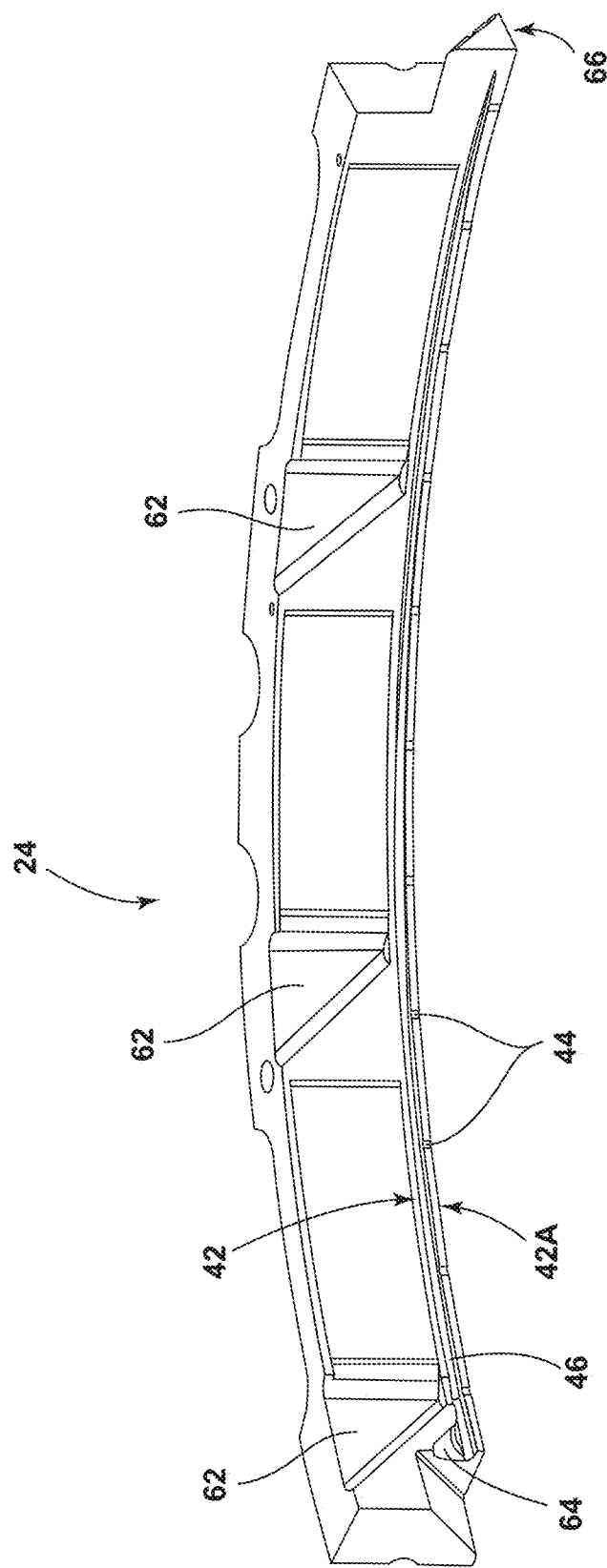

With reference to the embodiment of a radial seal segment 24 illustrated in FIG. 12, a single air dam groove 46 may be provided, and the air dam groove 46 may have a tapering depth. A plurality of air curtain generators 44 (e.g., shallow air curtain generators) may be provided along the air dam 42. An axial groove 60 may not be included. In an embodiment, an air dam groove 46 may be configured to be fed by a female joint 64 and the pad inlets 62 may not be configured to feed the air dam groove 46. With such embodiments, an air dam groove 46 of tapering depth may be fed by a female joint 64 and a plurality of substantially equally spaced air curtain generators 44 may be provided along an inner diameter 42A of the air dam 42. The radial seal segment 24 may include a male joint 66 that may be disposed at an opposite end of the radial seal segment 24 from the female joint 64. The female joint 64 may be configured for connection with a male joint of an adjacent radial seal segment that may be configured in a similar or the same manner as the male joint 66 of the radial seal segment 24. A plurality of radial seal segments 24 may be connected together (e.g., via female joints 64 and male joints 66), such as to form a complete ring.

Figure 13:
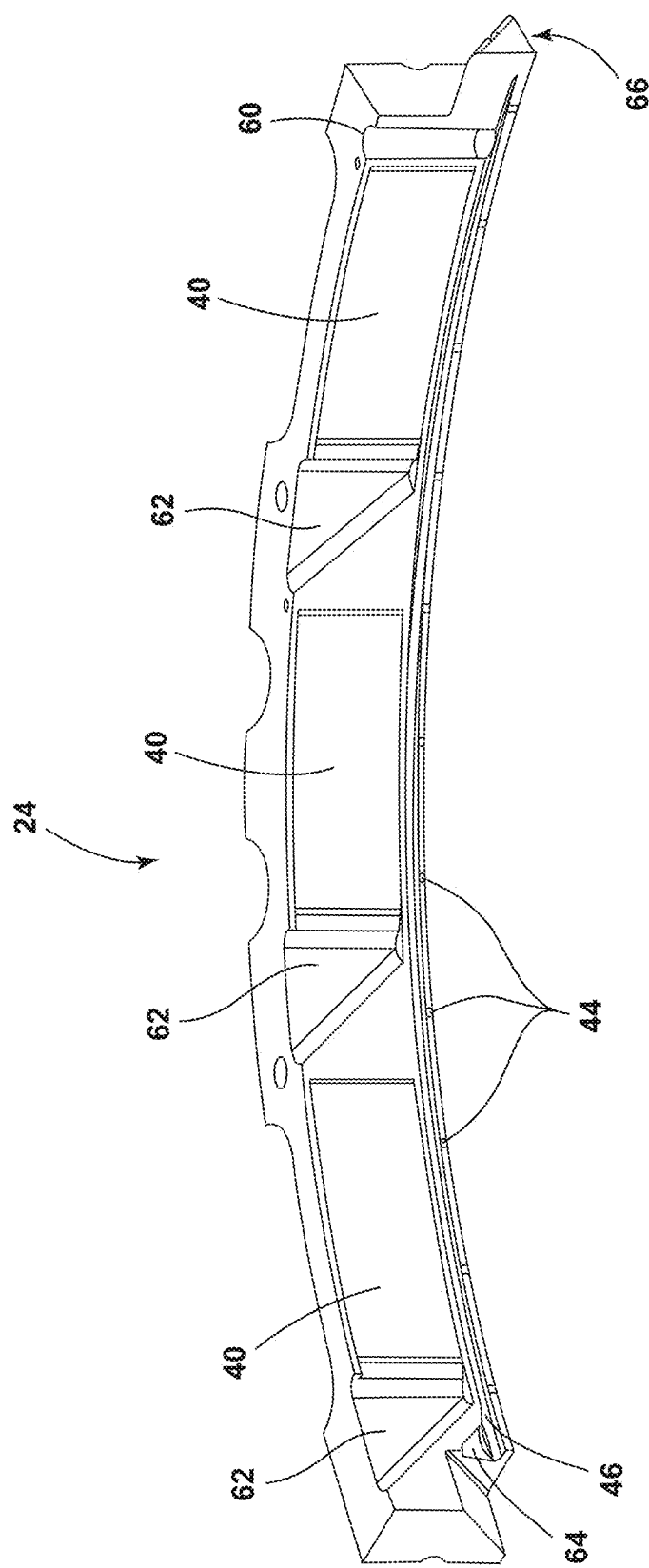

Another embodiment of a radial seal segment 24 is illustrated in FIG. 13. The illustrated embodiment is similar to that shown in FIG. 12, as a single air dam groove 46 (which may have a tapering depth) may be fed by a female joint 64, and may not be fed by pad inlets 62. However, the instant embodiment may include an axial groove 60 that may be connected to the air dam groove 46, and may be configured to serve as a drain. With such an embodiment, a rear axial groove 60 (such as generally illustrated) may serve as an exit to channel fluid (e.g., oil) out of the air dam groove 46. Air curtain generators 44 may be substantially equally spaced along an inner diameter 42A of the air dam 42 (e.g., to potentially provide a high differential pressure configuration).

Figure 14:
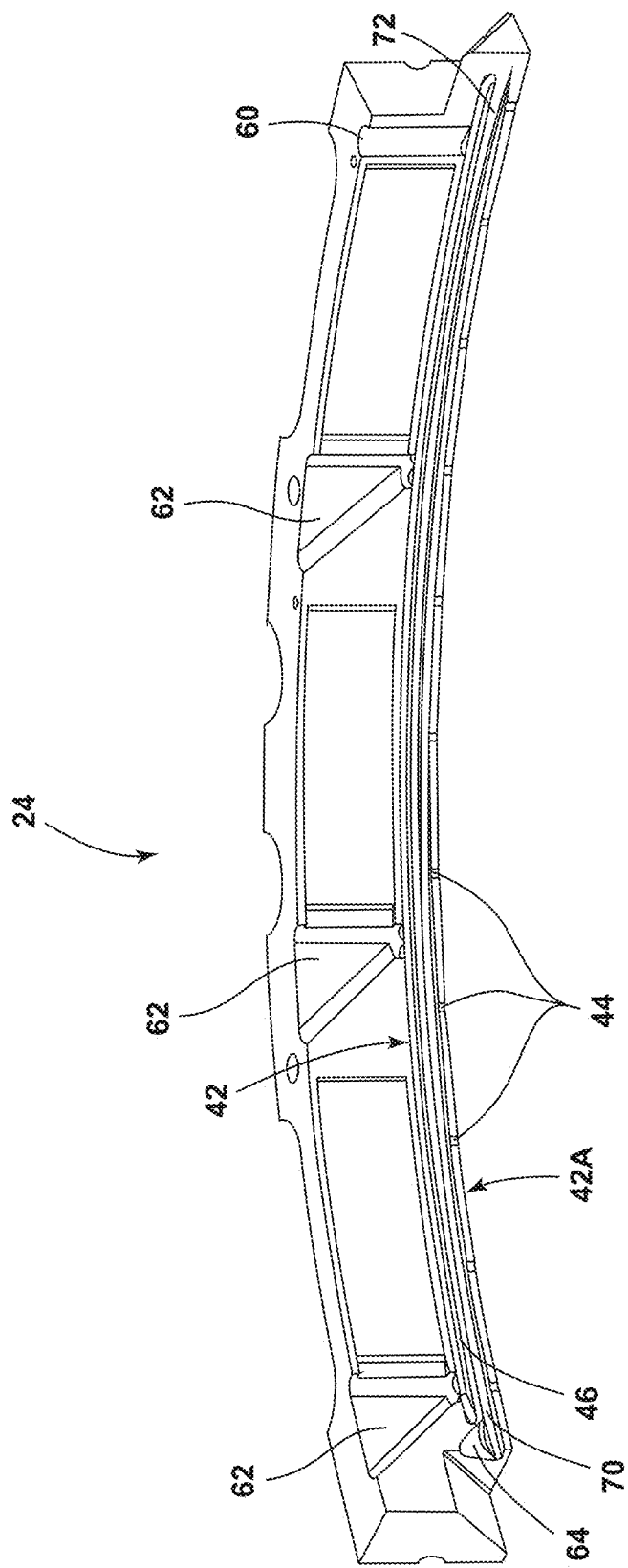

Another embodiment of a radial seal segment 24 is illustrated in FIG. 14. The radial seal segment 24 may include a primary air dam groove 46, pad inlets 62 may be configured to feed the primary air dam groove 46, and an axial groove 60 may be connected to the primary air dam groove 46. As generally illustrated, the radial seal segment 24 may also include a secondary radial air dam groove 70, which may be fed, for example, by a female joint 64 of the radial seal segment. In embodiments, the secondary air dam groove 70 may have a tapering depth, and air curtain generators 44 (e.g., shallow air curtain generators) may be provided along the secondary air dam groove 70. With such configurations, an air dam groove 46, which may have a constant depth, may be supplemented by a secondary air dam groove 70, which have a tapering depth and may be fed by a female joint 64. Air curtain generators 44 may be substantially equally spaced along an inner diameter 42A of the air dam 42. The secondary air dam groove 70 may be disposed axially outward of the primary air dam groove 46 and/or the secondary air dam groove 70 may be disposed closer to and in direct fluid communication with the air curtain generators 44. The axial groove 60 may not be connected (e.g., directly) to the secondary air dam groove 70. The primary radial dam groove 46 and the secondary air dam groove 70 may be separated by a land 72 that may be disposed partially or entirely between the primary radial dam groove 46 and the secondary air dam groove 70 (e.g., in an axial direction).

Figure 15:
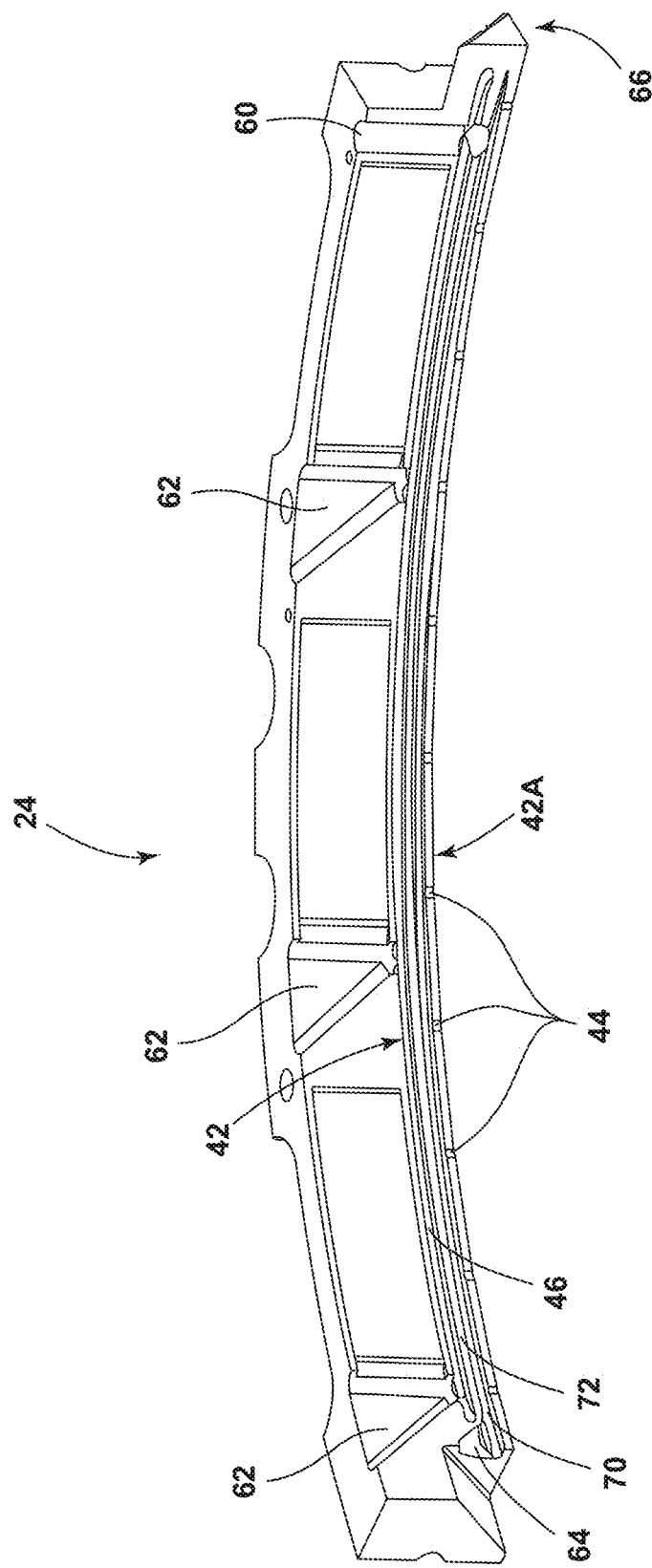

Another embodiment of a radial seal segment 24 is illustrated in FIG. 15. The illustrated embodiment is similar to that shown in FIG. 14, as the radial seal segment 24 may include a primary air dam groove 46 and a secondary air dam groove 70. However, as illustrated, the axial groove 60 may be connected (e.g., directly) to both the primary air dam groove 46 and the secondary air dam groove 70. With such a configuration, a primary air dam groove 46, which may have a substantially constant depth, may be supplemented by a secondary air dam groove 70, which may have a tapering depth, may be fed by a female joint 64, and a rear axial groove 60 connected to the primary air dam groove 46, such as to serve as an exit to channel out fluid (e.g., oil) out of the primary air dam groove 46 and/or the secondary air dam groove 70. Air curtain generators 44 may be substantially equally spaced along an inner diameter 42A of the air dam 42 (e.g., to potentially provide a high differential pressure configuration).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A radial seal segment, comprising:
   a radial air dam;
   wherein the radial air dam includes at least one air dam groove along an inside diameter of the radial air dam, and at least one air curtain generator positioned axially along the inside diameter of the radial air dam, the at least one air dam groove and the at least one air curtain generator positioned axially adjacent one another such that fluid is flowable from the at least one air damn groove through the air curtain generator to generate an air curtain;
   wherein the at least one air dam groove includes a plurality of individual air dam grooves having circumferentially tapered depths.

2. The radial seal segment of claim 1, including one or more hydrodynamic features.

3. The radial seal segment of claim 2, wherein the one or more hydrodynamic features are in fluid communication with radial air dam.

4. The radial seal segment of claim 2, wherein the at least one air curtain generator is provided at a first axial side of the radial seal segment; and at least one hydrodynamic feature of the one or more hydrodynamic features extends to a second axial side of the radial seal segment.

5. The radial seal segment of claim 2, wherein the at least one air curtain generator is configured to provide high pressure gas generated via the one or more hydrodynamic features to a fluid side of the radial seal segment.

6. The radial seal segment of claim 2, wherein the at least one air curtain generator is configured to increase a pressure differential across the one or more hydrodynamic features.

7. The radial seal segment of claim 1, wherein the at least one air curtain generator comprises a series of sequential features.

8. The radial seal segment of claim 7, wherein the series of sequential features includes a series of sequential reliefs.

9. The radial seal segment of claim 1, wherein the at least one air curtain generator has a curved or semi-circular shape.

10. The radial seal segment of claim 1, wherein the at least one air curtain generator is configured to restrict fluid ingress.

11. The radial seal segment of claim 1, wherein the plurality of individual air dam grooves includes a primary air dam groove and a second air dam groove axially-spaced from the primary air dam groove.

12. The radial seal segment of claim 1, including an axial groove connected to the radial air dam; wherein the axial groove is configured as a drain for the radial air dam.

13. The radial seal segment of claim 1, including a first pad inlet and a second pad inlet; wherein the radial air dam includes an air dam groove; the first pad inlet is configured to feed the air dam groove; and the second pad inlet is not configured to feed the air dam groove.

14. The radial seal segment of claim 1, including a female joint; wherein the radial air dam includes an air dam groove; and the air dam groove is configured to receive fluid from an adjacent radial seal segment via the female joint.

15. A sealing assembly, comprising:
   a seal housing; and
   a radial seal segment connected to the seal housing;
   wherein the radial seal segment includes a radial air dam; and the radial air dam includes at least one air damn groove along an inside diameter of the radial air dam, and at least one air curtain generator positioned axially along the inside diameter of the radial air dam, the at least one air dam groove and the at least one air curtain generator positioned axially adjacent one another such that fluid is flowable from the air damn groove through the air curtain generator to generate an air curtain;
   wherein the at least one air dam groove includes a plurality of individual air dam grooves having circumferentially tapered depths.

16. The seal assembly of claim 15, including one or more hydrodynamic features.

17. The seal assembly of claim 16, including a seal runner; wherein the radial air dam and the one or more hydrodynamic features are open toward the seal runner.

18. The seal assembly of claim 16, wherein the radial seal segment includes an air side and a fluid side; the one or more hydrodynamic features are configured to provide high-pressure air to the at least one air curtain generator; and the at least one air curtain generator is configured to provide the high-pressure air to the fluid side.

* * * * *